(12) United States Patent
Kume et al.

(10) Patent No.: US 6,847,185 B2
(45) Date of Patent: Jan. 25, 2005

(54) APPARATUS FOR SWITCHING WINDINGS OF AC THREE-PHASE MOTOR

(75) Inventors: Tsuneo Kume, Fukuoka (JP); Swamy Mahesh, Fukuoka (JP)

(73) Assignee: Kabushiki Kaisha Yaskawa Denki, Kitakyushu (JP)

(*) Notice: Subject to any disclaimer, the term of this patent is extended or adjusted under 35 U.S.C. 154(b) by 0 days.

(21) Appl. No.: 10/491,410

(22) PCT Filed: Mar. 22, 2002

(86) PCT No.: PCT/JP02/02800
§ 371 (c)(1),
(2), (4) Date: Apr. 1, 2004

(87) PCT Pub. No.: WO03/032482
PCT Pub. Date: Apr. 17, 2003

(65) Prior Publication Data
US 2004/0195994 A1 Oct. 7, 2004

(30) Foreign Application Priority Data
Oct. 3, 2001 (JP) ........................................ 2001-307580

(51) Int. Cl.$^7$ ................................................ H02P 7/40
(52) U.S. Cl. ........................ 318/732; 318/138; 318/771; 318/254; 322/22
(58) Field of Search ................................ 318/138, 139, 318/140, 254, 439, 732, 430, 771; 322/22; 180/65.1

(56) References Cited

U.S. PATENT DOCUMENTS

| | | | | |
|---|---|---|---|---|
| 4,214,196 A | * | 7/1980 | Boyce | 318/811 |
| 4,443,748 A | * | 4/1984 | Boev et al. | 318/732 |
| 4,540,922 A | * | 9/1985 | Horvath et al. | 318/490 |
| 6,774,590 B2 | * | 8/2004 | Inagawa et al. | 318/139 |
| 2003/0107348 A1 | * | 6/2003 | Inagawa et al. | 322/22 |
| 2004/0084229 A1 | * | 5/2004 | Stancu et al. | 180/65.1 |

FOREIGN PATENT DOCUMENTS

| | | | |
|---|---|---|---|
| DE | 19741300 A1 | * 3/1999 | ............ H02M/5/42 |
| JP | 49-58319 | 6/1974 | |
| JP | 41498 | 3/1982 | |

(List continued on next page.)

OTHER PUBLICATIONS

IEEE Transactions on Industry Applications, vol. 32, No. 4 Jul./Aug. 1996, M. Osama et al.: "A New Inverter Control Scheme for Induction Motor Drives Requiring Wide Speed Range", pp. 938–944.

Primary Examiner—Paul Ip
(74) Attorney, Agent, or Firm—Westerman, Hattori, Daniels & Adrian, LLP

(57) ABSTRACT

It is an object to provide a winding switching device of a three-phase AC motor having a small size at a low cost in which a time required for switching a winding is shortened and the number of semiconductor switch units is decreased as much as possible. In a winding switching device of a three-phase AC motor including an AC motor in which a winding having each phase is formed by a plurality of windings and a connecting terminal connecting the windings to each other and both terminals of the winding having the phase are provided on an outside of a motor, winding switching means for properly switching the connecting terminal, and a variable frequency power source for supplying a variable voltage having a variable frequency to the AC motor, the winding switching means is constituted by a plurality of three-phase rectifying means connecting one of ends of the winding having the phase to the variable frequency power source and connecting the other end and the connecting terminal to an input terminal on an AC side of the three-phase rectifying means for each phase, and a semiconductor switch provided to open and close both ends on a DC output side of the three-phase rectifying means.

4 Claims, 10 Drawing Sheets

FOREIGN PATENT DOCUMENTS

| | | |
|---|---|---|
| JP | 57-41498 | 3/1982 |
| JP | 64-85530 | 3/1989 |
| JP | 64-085530 | 3/1989 |
| JP | 02-106197 | 4/1990 |
| JP | 2-106197 | 4/1990 |
| JP | 7-99959 | 10/1995 |
| JP | 2742800 | 2/1998 |
| JP | 3037471 | 2/2000 |

* cited by examiner

HIGH-SPEED
CONNECTION
(SW1: ON)

LOW-SPEED
CONNECTION
(SW2: ON)

APPARATUS FOR SWITCHING WINDINGS OF AC THREE-PHASE MOTOR

TECHNICAL FIELD

The present invention relates to a winding switching device of a three-phase AC motor for enlarging a speed control range by switching the winding of the three-phase AC motor, and is intended for a wide range of industrial field including the driving operation of a vehicle, the driving operation of the main shaft of a machine tool, the traverse motion and running of a crane, a winding machine and a servo device.

BACKGROUND ART

In the driving devices of the main shaft of a machine tool and a vehicle which are to be driven by an AC variable frequency power source, a winding switching method has been employed as means capable of obtaining a sufficiently great torque in a low speed region and carrying out an operation in a high speed region.

As an example, a star-delta switching method shown in FIG. 6 has widely been used practically for the driving operation of the main shaft of a machine tool. In FIG. 6, 22 denotes a power source, 16 to 21 denote a diode constituting a three-phase full-wave rectifying bridge, and 15 denotes a smoothing capacitor. 14 denotes a converter section for converting the AC power source 22 into a DC power source. Terminals TP and TN are DC output terminals of the converter section 14, and serve as inputs of the inverter section 1. 2 denotes an AC motor, T1 to T6 denote a terminal to be used in switching, and 3 and 4 denote a switch such as an electromagnetic contactor. When the switch 4 is opened and the switch 3 is closed, a star connection is obtained. When the switch 4 is closed and the switch 3 is opened, a delta connection is obtained. N1 denotes a neutral point. In the low speed region, a star (Y) connection is selected to apply a sufficiently high voltage so that a great torque can be obtained for the same current. Since the impedance of the motor is increased in proportion to a frequency, the current flow might be impeded in the high speed region in which the frequency is increased. By selecting a delta (Δ) connection having a low impedance, therefore, the current flow can be conducted easily.

In FIG. 7, two sets of star windings are switched in series and parallel. A switch 5 is closed to connect the windings in series at a low speed, and switches 6 and 7 are closed to connect the windings in parallel at a high speed. Consequently, the same advantage as that of FIG. 6 can be obtained. Furthermore, FIG. 8 is obtained by simplifying the circuit in FIG. 7. When a switch 8 is closed, all windings are utilized equivalently to a series connection. When a switch 9 is closed, a part of the windings is used so that a characteristic corresponding to a parallel connection in FIG. 7 is obtained. In this case, the residual windings are not used but in an idle state. For this reason, a current density is increased to be a double of that in FIG. 7. However, the number of winds for creating a magnetic flux is equal. Consequently, an induced voltage and a torque characteristic are basically equivalent to those in the parallel connection.

While switching in two stages is carried out in all the examples described above, a method of carrying out switching in three stages, and furthermore, a more precise control has been disclosed in U.S. Pat. No. 3,037,471.

In all the examples described above, it is assumed that switching is carried out by a switch having a mechanical contact. There has been made a proposal for reducing a dead time for switching with the operating time of the switch. FIG. 9 has been disclosed in JP-B-7-99959 by the applicant, in which two sets of inverters are combined to switch a star connection and a delta connection without contact by a change in a method of controlling each inverter. FIG. 10 has been published in IEEE Transactions on Industry Applications, Vol. 32d No. 4, July/August, 1996, pp. 938–944. Two sets of windings having different specifications which are provided in the same motor are driven by two inverters and a combination of respective current vectors is changed, thereby switching double-pole and four-pole characteristics.

Moreover, U.S. Pat. No. 2,742,800 has disclosed a method of applying circuits connecting, as a switching unit, a semiconductor control unit and a diode for blocking a reverse voltage in series which are connected in antiparallel based on the circuit in FIG. 8.

In the methods shown in FIGS. 6, 7 and 8 and the technology in the U.S. Pat. No. 3,037,471, the switching is carried out with a switch having a contact. Accordingly, it is necessary to take a time for such a mechanism operation as to turn on and off the contact. Moreover, it is desirable that a current should be once blocked on an inverter side to carry out so-called non-current switching in consideration of the lifetime of the contact. When these operating times are summed, the dead time that cannot be disregarded (usually, several tens milliseconds) is generated. For example, the dead time influences the quality of an end product in a driving device for the main shaft of a machine tool, and furthermore, influences a feeling of riding in a driving device for a vehicle. A limited contact lifetime itself is also a disadvantage which cannot be permitted.

In the methods of FIGS. 8 and 9 and the U.S. Pat. No. 2,742,800, the switching is carried out by opening and closing through the semiconductor unit or a change in a control mode. Consequently, the problem of the operating time can be improved. Since the number of active semiconductor units to be required is large one, a cost might be a factor in impediment to practical use.

In the methods of FIG. 8 and the U.S. Pat. No. 2,742,800, furthermore, a voltage induced into the residual winding portions is added to a supply voltage and a high voltage is applied to an unused terminal when a power is supplied to the neutral point of the winding. Therefore, it is necessary to intensify an insulation.

DISCLOSURE OF THE INVENTION

The invention has been made in consideration of the problems and has an object to provide a winding switching device of a three-phase AC motor implementing the following (1) to (3).

(1) A time required for switching a winding is shortened.

(2) The number of semiconductor switch units for switching a winding is reduced as much as possible to reduce a size and a cost without using a switch having a mechanical movable section.

(3) Also in the case in which an intermediate point power of a winding is to be supplied, a voltage induced into a residual unused winding portion can be prevented from being raised no less than a supply voltage whereby the insulation of the winding needs not to be strengthened.

In order to attain the object, the invention provides a winding switching device of a three-phase AC motor comprising an AC motor in which a winding having each phase is formed by a plurality of windings and a connecting terminal connecting the windings to each other and both terminals of the winding having the phase are provided on an outside of a motor, winding switching means for properly switching the connecting terminal, and a variable frequency power source for supplying a variable voltage having a variable frequency to the AC motor, wherein the winding switching means includes a plurality of three-phase rectifying means connecting one of ends of the winding having the phase to the variable frequency power source and connecting the other end and the connecting terminal to an input terminal on an AC side of the three-phase rectifying means for each phase, and a semiconductor switch provided to open and close both ends on a DC output side of the three-phase rectifying means.

Moreover, the winding switching device of the three-phase AC motor according to the first aspect of the invention is characterized in that the three-phase rectifying means are formed into a three-phase full-wave rectifying diode bridge.

Furthermore, the winding switching device of the three-phase AC motor according to the first aspect of the invention is characterized in that the DC output side of the three-phase rectifying means is connected to a parallel circuit including a resistor and a capacitor through a diode provided in such a direction that a current flowing from the three-phase rectifying means flows to the parallel circuit when the semiconductor switch is OFF and does not flow backward from the parallel circuit to the semiconductor switch when the semiconductor switch is ON at both ends on the DC output side of each of the three-phase rectifying means.

In addition, the winding switching device of the three-phase AC motor according to the first aspect of the invention is characterized in that the DC output side of the three-phase rectifying means is connected to a DC bus of the variable frequency power source through a diode provided in such a direction that a current flowing from the three-phase rectifying means flows to the DC bus of the variable frequency power source when the semiconductor switch is OFF and does not flow backward from the DC bus of the variable frequency power source to the semiconductor switch when the semiconductor switch is ON at both ends on the DC output side of each of the three-phase rectifying means.

Since the switching is carried out by the semiconductor, the switching operation can be completed in a very short time with a small number of semiconductor units.

Even if a mode for partially using the winding is selected, moreover, it is possible to avoid an extreme increase in a voltage induced to the residual terminals.

In a winding switching device of a three-phase AC motor comprising an AC motor in which a winding having each phase is formed by a plurality of windings and a connecting terminal connecting the windings to each other and both terminals of the winding having the phase are provided on an outside of a motor, winding switching means for properly switching the connecting terminal, and a variable frequency power source for supplying a variable voltage having a variable frequency to the AC motor, the winding switching means is constituted by a plurality of three-phase rectifying means connecting one of ends of the winding having the phase to the variable frequency power source and connecting the other end and the connecting terminal to an input terminal on an AC side of the three-phase rectifying means for each phase, and a semiconductor switch provided to open and close both ends on a DC output side of the three-phase rectifying means. Consequently, the following advantages can be obtained.

(1) A time required for switching a winding can be reduced.

(2) The number of semiconductor switch units for switching a winding can be reduced as much as possible to reduce a size and a cost without using a switch having a mechanical movable section.

(3) Also in the case in which an intermediate point power of a winding is to be supplied, a voltage induced into a residual unused winding portion can be prevented from being raised to be equal to or higher than a supply voltage and the insulation of the winding does not need to be intensified.

(4) In the case of a discharging resistor being omitted to obtain a state shown in FIG. 5, moreover, an energy is not radiated as a heat loss by the resistor but is absorbed into the smoothing capacitor of the variable frequency power source. Consequently, the energy can be reused for motor driving.

As a ripple effect, the winding can be switched in a considerably short time as compared with a switching method using a contact. Consequently, it is possible to minimize the influence of the switching on a machine and a device to be loads.

BEST MODE FOR CARRYING OUT THE INVENTION

Figure 1:
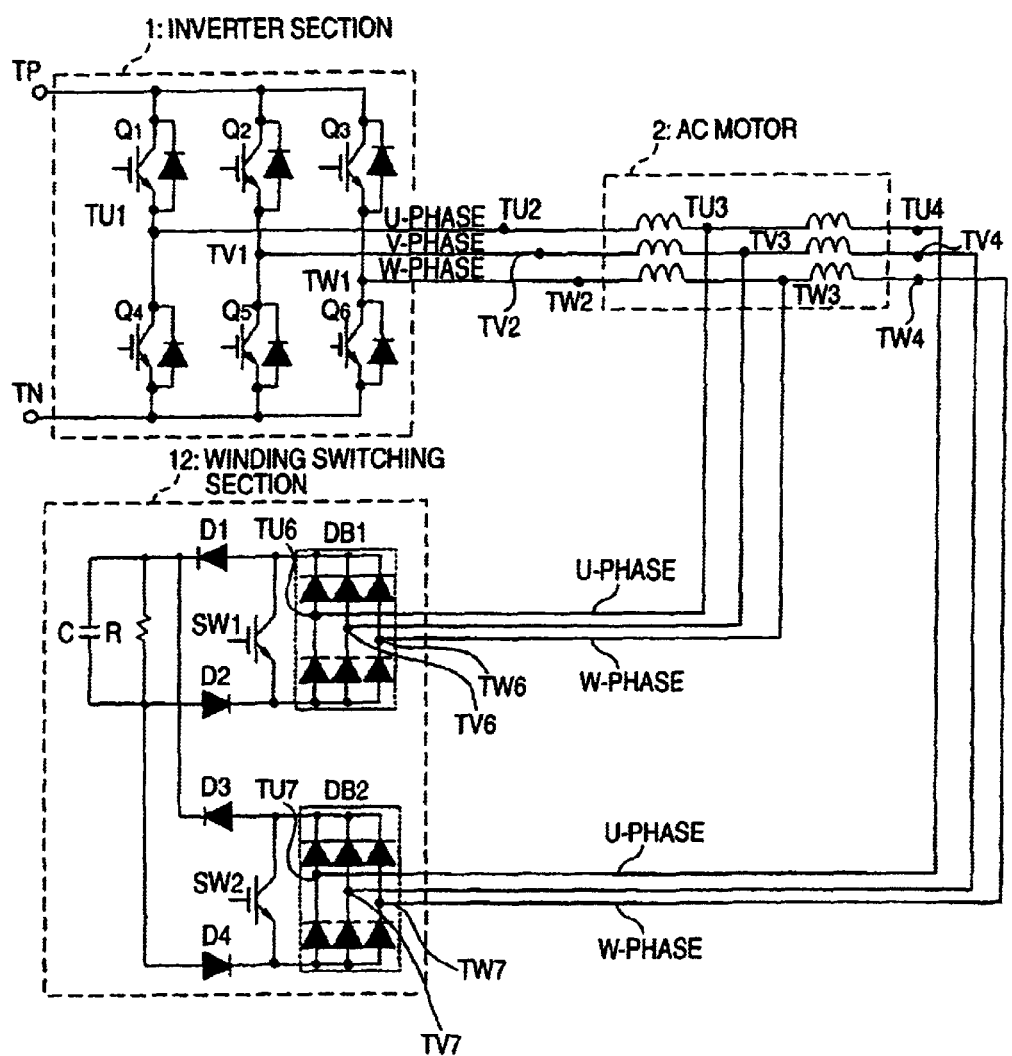
FIG. 1 is a diagram showing the structure of a basic circuit according to a first embodiment of the invention.

Embodiments of the invention will be described below with reference to the drawings. FIG. 1 is a diagram showing the structure of a basic circuit according to a first embodiment of the invention. In FIG. 1, 1 denotes an inverter section to be a variable frequency variable voltage source for a 3-phase motor control which is constituted by main circuit transistors Q1 to Q6. Terminals TP and TN are connected to the DC output terminal of a converter. 2 denotes an AC motor and 12 denotes a winding switching section. Each phase winding of the motor 2 is formed by two coils, and intermediate terminals TU3, TV3 and TW3 connected to the coils are taken as the external terminals of the motor. TU2, TV2 and TW2 to be the ends of winding terminals having each phase in the AC motor 2 are connected to output terminals TU1, TV1 and TW1 having each phase in the inverter section 1, respectively.

The other ends TU4, TV4 and TW4 of the winding terminals having each phase in the AC motor 2 are connected to AC input terminals TU7, TV7 and TW7 of a three-phase diode bridge DB2 in the winding switching section 12, respectively. The intermediate terminals TU3, TV3 and TW3 having each phase in the AC motor are connected to AC input terminals TU6, TV6 and TW6 of a three-phase diode bridge DB1 in the winding switching section 12, respectively. SW1 and SW2 connected across the DC output side to open and close the DC output sides of the three-phase diode bridges DB1 and DB2 are self-arc-extinguishing semiconductor switching units such as a bipolar transistor and an IGBT.

The structure of the winding switching section 12 will be described. D1 and D2 denote a diode connected to the DC output side of the three-phase diode bridge DB1. D3 and D4 denote a diode connected to the DC output side of the three-phase diode bridge DB2. The diodes D1 and D2 serve to cause a current flowing in DB1 to a parallel circuit of CR when the semiconductor switch SW1 is OFF and to prevent the current from flowing backward from the parallel circuit of CR to SW1 when SW1 is ON. The diodes D3 and D4 also serve to prevent the backward flow in the same manner as the diodes D1 and D2. C denotes a capacitor and R denotes a discharging resistor. C and R are connected in parallel with each other. One of ends on the cathode side of the diode D1 is connected to one of the ends of a CR parallel connecting terminal and one of ends on the cathode side of the diode D3. One of ends on the anode side of the diode D1 is connected to the positive side terminal of the DC output of the three-phase diode bridge DB1 and the collector of SW1. One of ends on the anode side of the diode D2 is connected to the other end of the CR parallel connecting terminal and one of ends on the anode side of the diode D4. One of ends on the cathode side of the diode D2 is connected to the negative side terminal of the DC output of the three-phase diode bridge DB1 and the emitter of SW1. One of ends on the anode side of the diode D3 is connected to the positive side terminal of the DC output of the three-phase diode bridge DB2 and the collector of SW2. One of ends on the cathode side of the diode D4 is connected to the negative side terminal of the DC output of the three-phase diode bridge DB2 and the emitter of SW2.

Next, an operation in FIG. 1 will be described. When only SW1 is turned ON (SW2 is OFF), the motor terminals TU3, TV3 and TW3 are short-circuited through DB1 so that a voltage is applied to a star connection constituted by TU2–TU3, TV2–TV3, and TW2–TW3 to be a part of motor windings. Although a voltage is induced to the terminals TU4, TV4 and TW4 by an electromagnetic coupling between the windings, the resistance value of the discharging resistor R is large. For this reason, a current flowing to D3, R and D4 might be small enough to be negligible. With this structure, an impedance is lower than that in the case in which all the motor windings are used. Therefore, this structure can cause a sufficient current to flow even in a high frequency region and is therefore suitable for a high-speed operation. On the other hand, when only SW2 is turned ON (SW1 is OFF), the motor terminals TU4, TV4 and TW4 are short-circuited through DB2 so that a voltage is applied to a star connection constituted by all the windings TU2–TU4, TV2–TV4 and TW2–Tw4. In this case, since the resistance value of the discharging resistor R is great, a current flowing from the negative side terminal on the DC output side of DB1 to D1, R and D2 might be small enough to be negligible. With this structure, since an impedance is higher than that in the case in which a part of the former motor windings is used, a sufficient voltage can be applied also in a low frequency region and a great torque can be generated for the same current. For this reason, this structure is suitable for an operation at a low speed. Accordingly, it is possible to enlarge a speed control range by selectively turning ON SW1 or SW2 corresponding to an operating speed.

Figure 5:
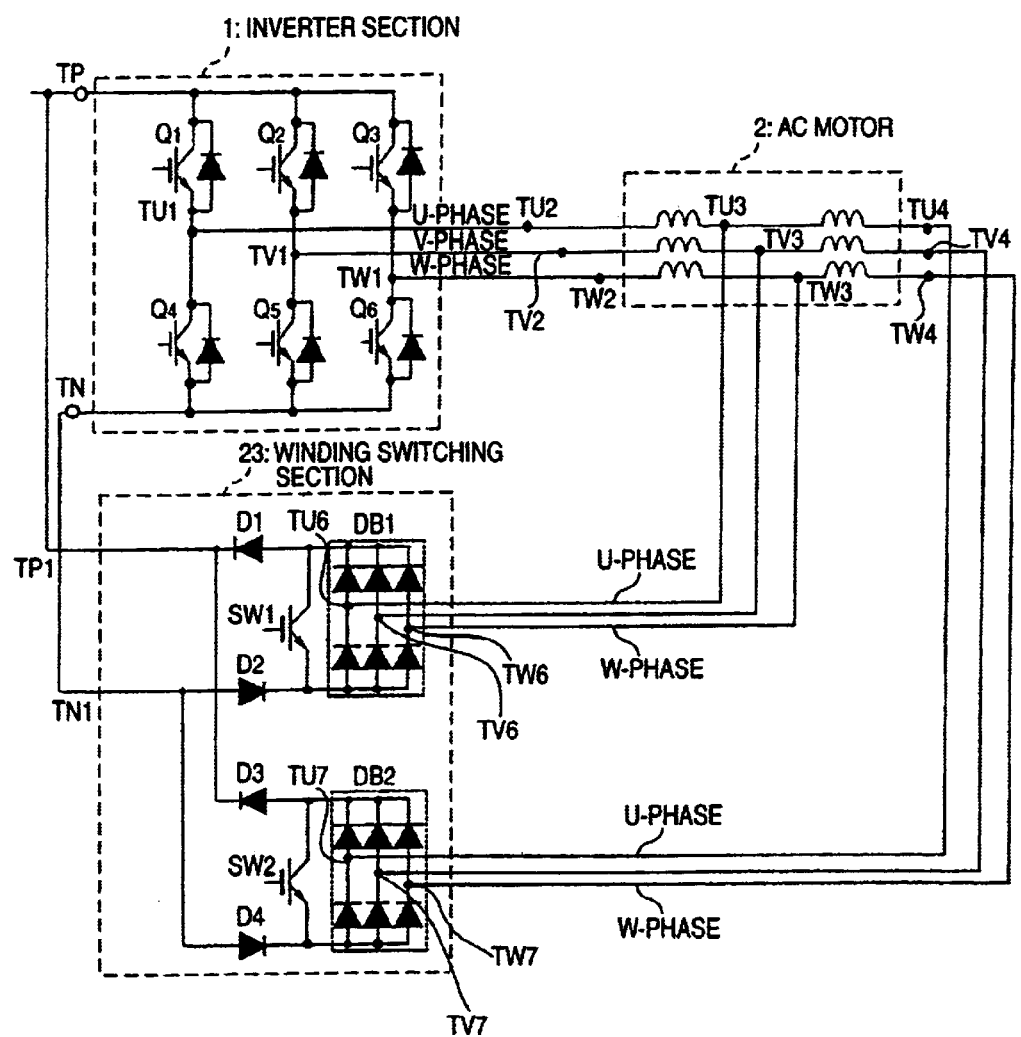
FIG. 5 is a diagram showing the structure of a circuit according to an applied variant of the first embodiment in accordance with the invention (FIG. 1).
Figure 6:
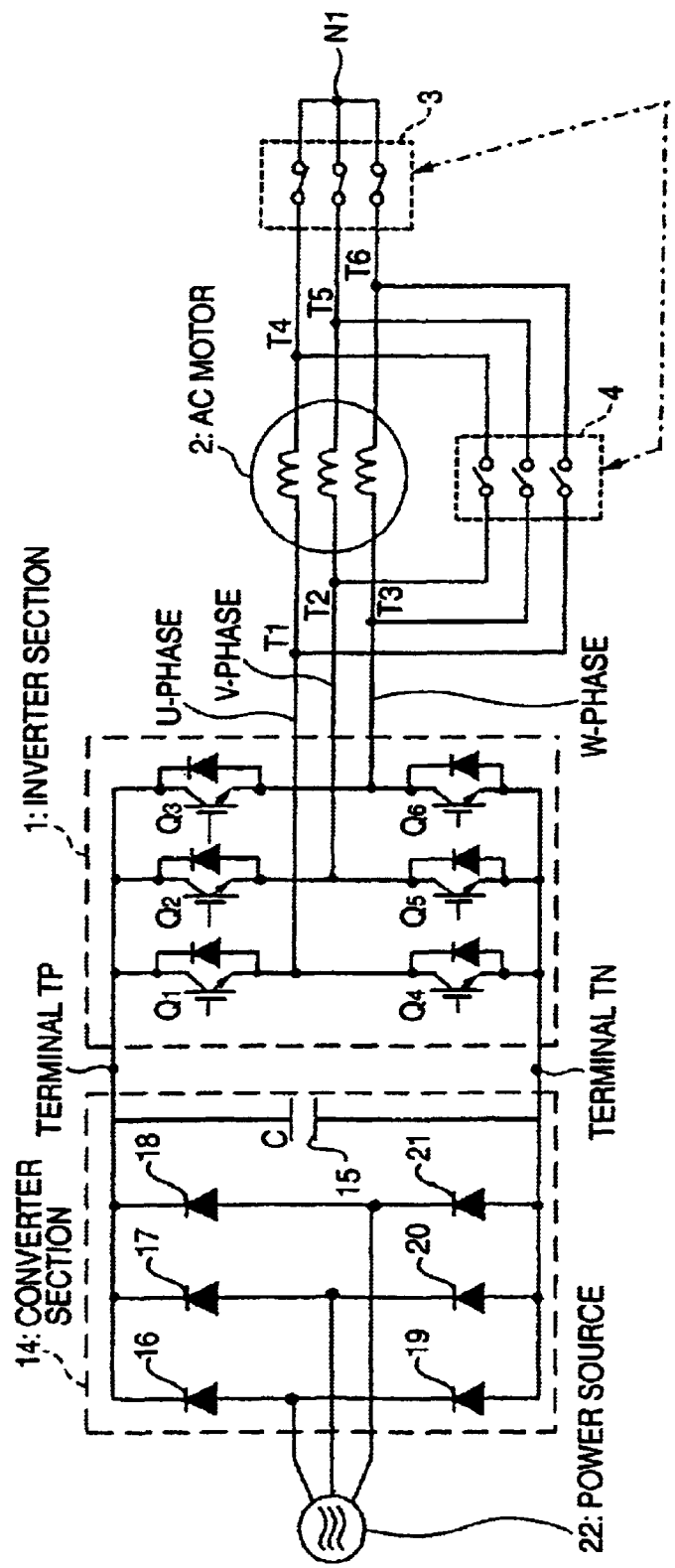
FIG. 6 is a diagram showing the structure of conventional star-delta winding switching.
Figure 7:
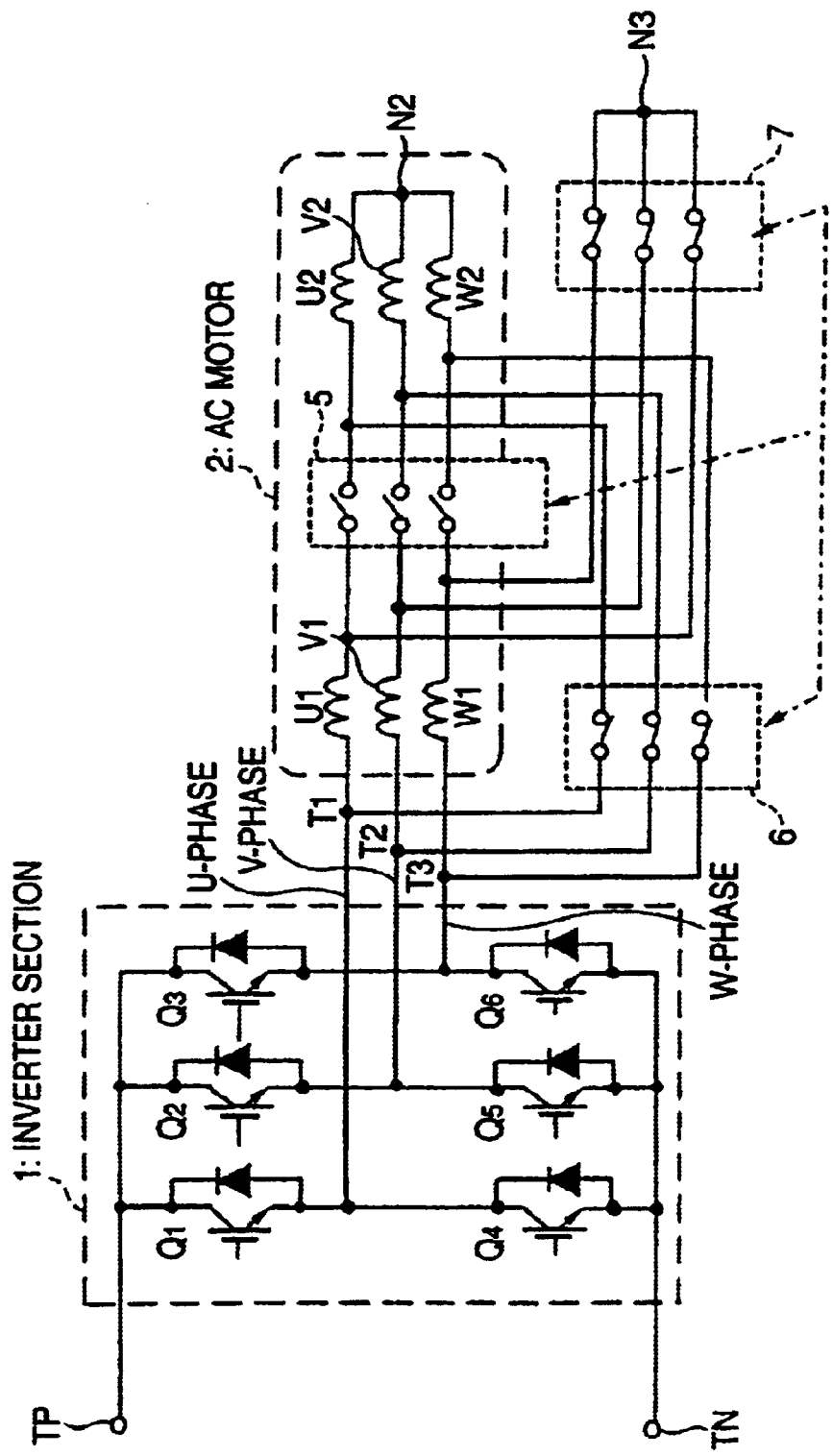
FIG. 7 is a diagram showing the conventional art in which two sets of star windings are switched in series and parallel.
Figure 8:
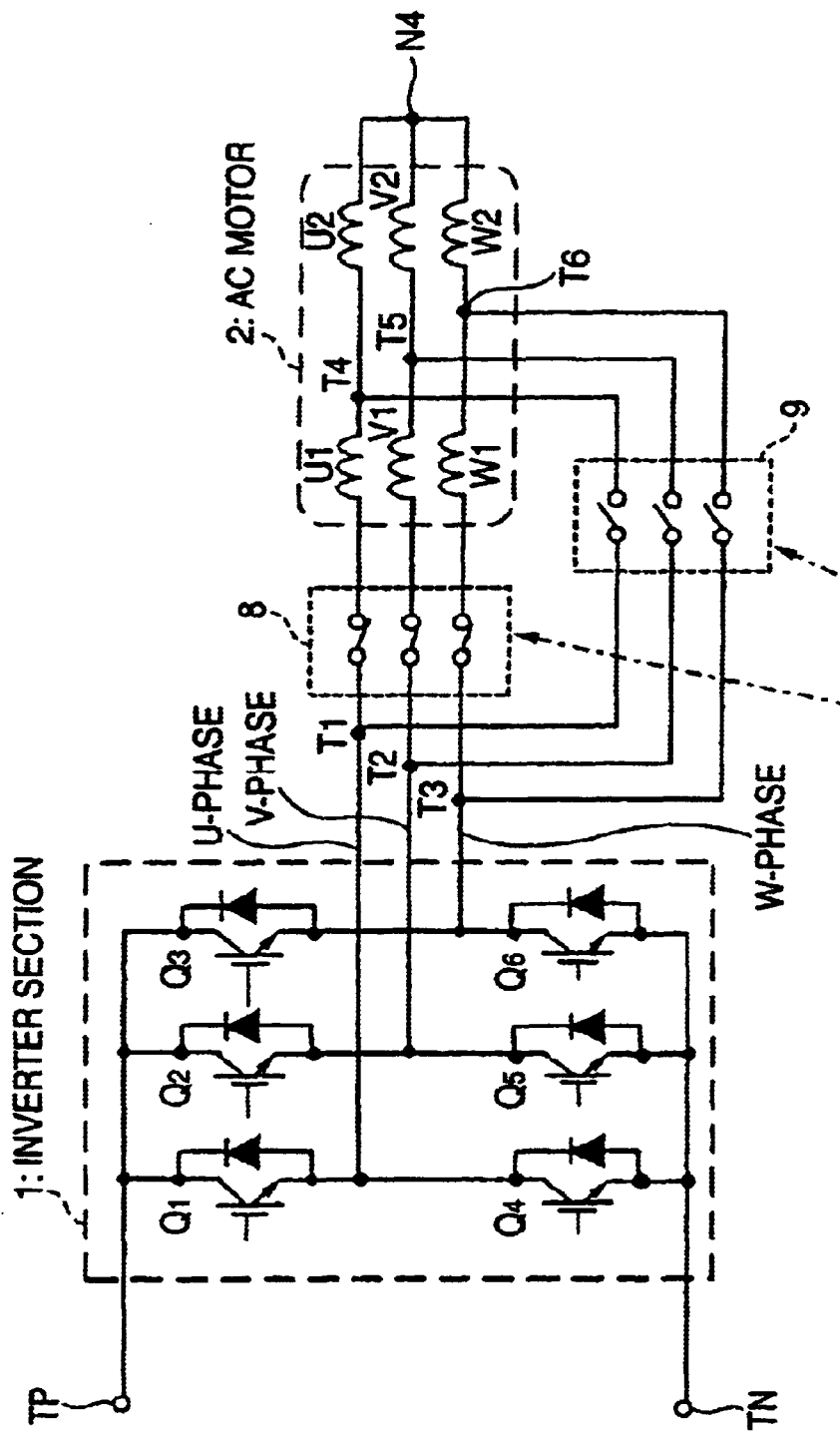
FIG. 8 is a diagram showing the structure of conventional winding switching.
Figure 9:
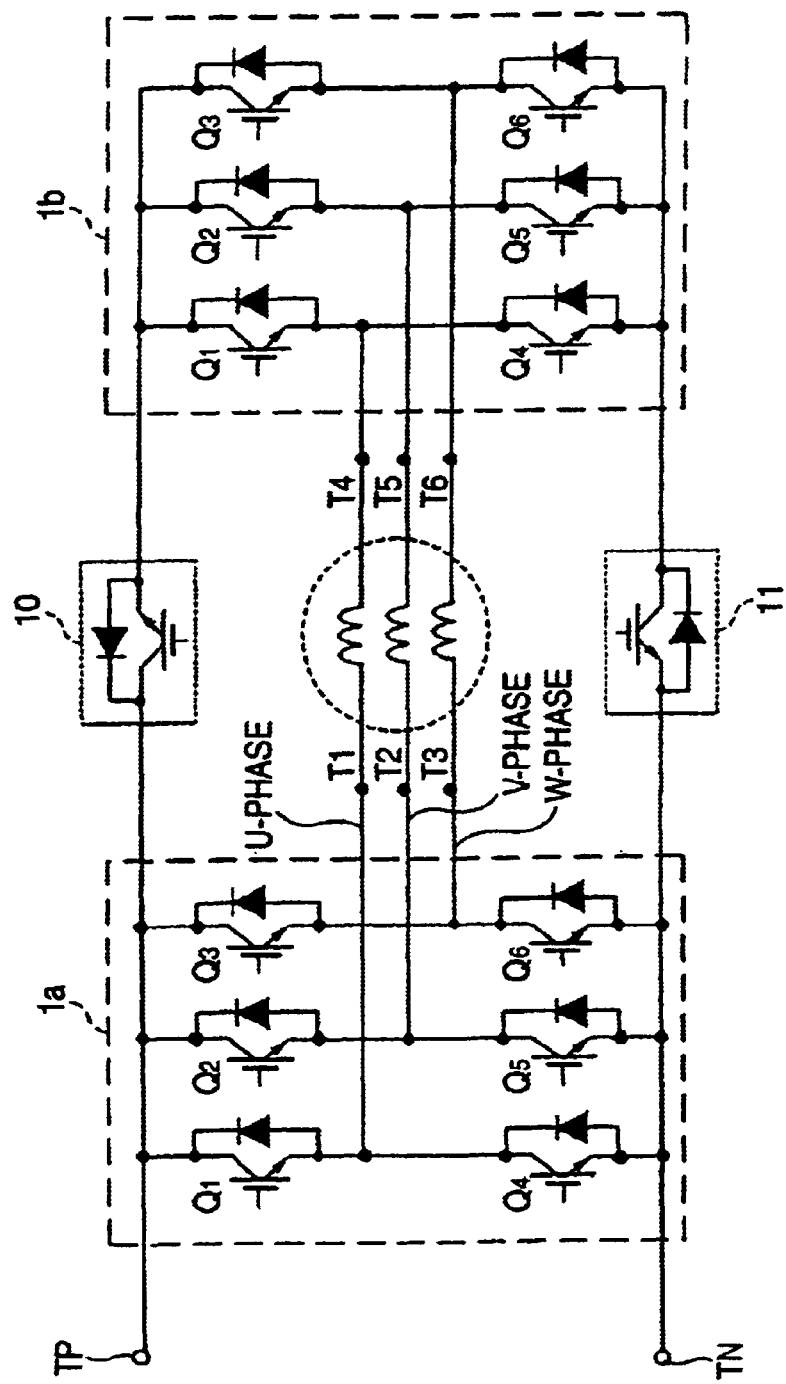
FIG. 9 is a diagram showing the conventional art in which two sets of inverters are combined.
Figure 10:
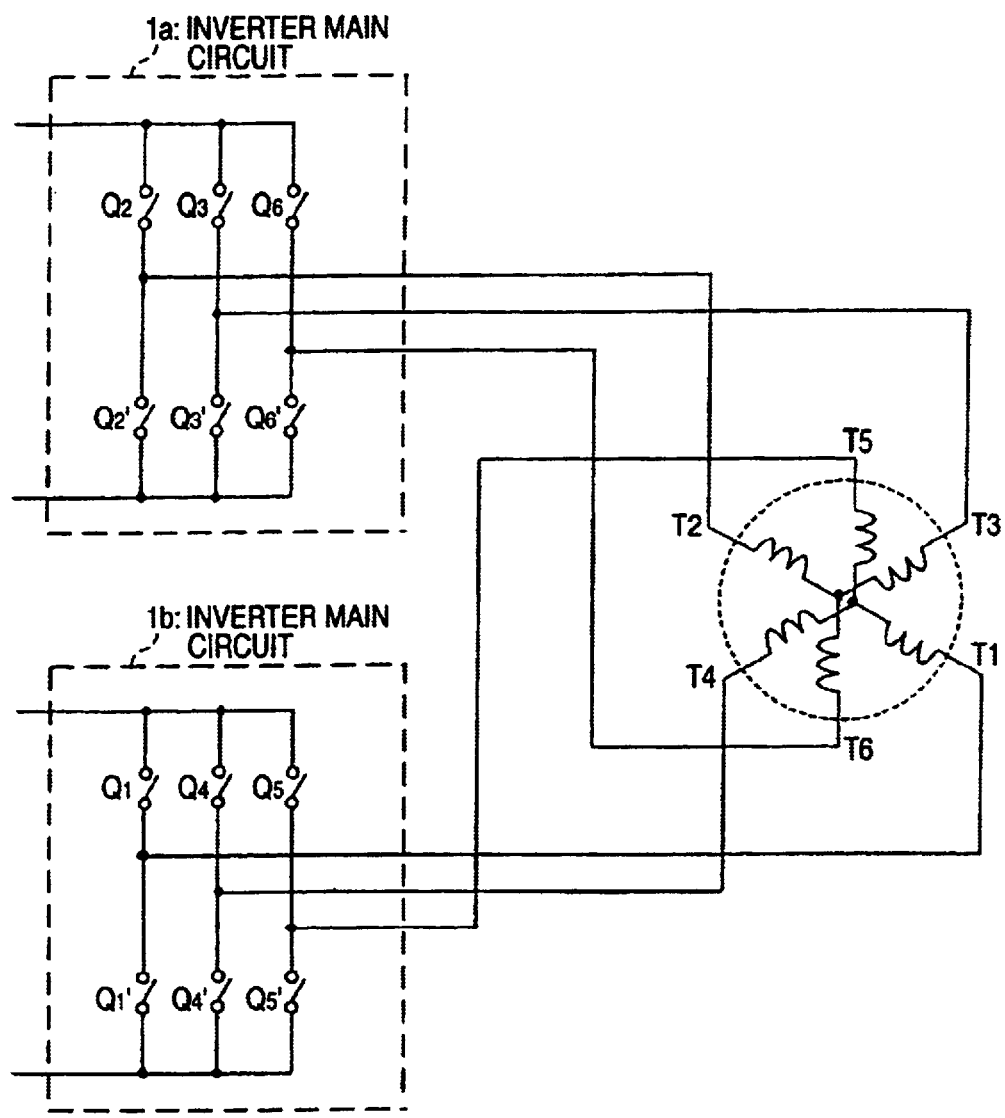
FIG. 10 is a diagram showing the structure of the conventional winding switching.

FIG. 5 shows the structure of a circuit according to an embodiment to be a variant of FIG. 1 according to the invention. The structure of the circuit in FIG. 5 is different from that of the circuit in FIG. 1 in that the backward flow preventing diode of the winding switching section is connected to the parallel circuit of the capacitor C and the resistor R in FIG. 1, while the backward flow preventing diode is connected to the DC bus of a variable frequency power source in FIG. 5. More specifically, the diodes of D1 and D3 are connected from a terminal TP1 to the input terminal TP on the DC side of the inverter section 1 to be a variable frequency power source, and the anodes of D2 and D4 are connected from a terminal TN1 to the input terminal TN on the DC side of the inverter section 1. As a result, the energy of a current flowing from DB1 and DB2 is not radiated as a heat loss by a resistor but is absorbed into the smoothing capacitor of the variable frequency power source and can be reused for the driving operation of a motor.

Figure 2:
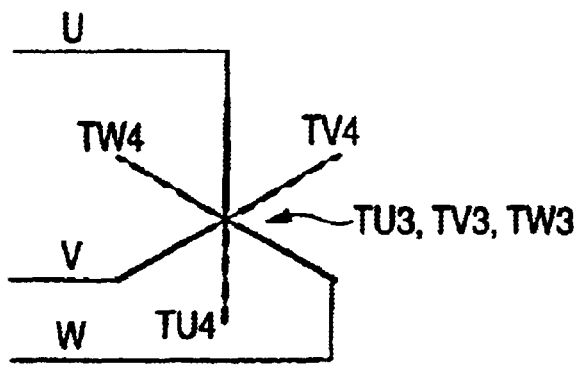
FIG. 2 is a diagram showing a voltage state according to the invention.
Figure 2:
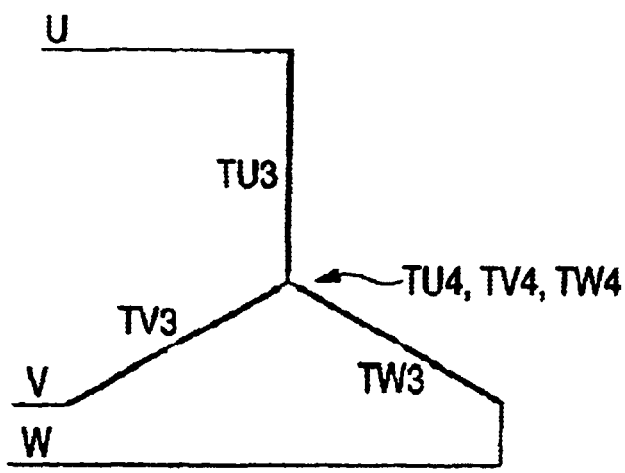

FIG. 2 represents, in a vector, the state of a voltage obtained when SW1 is turned ON and SW2 is turned ON. It is apparent that only an equivalent voltage to a supply voltage is induced to the residual winding terminals (TU3, TV4 and TW4) also when a high-speed winding (FIG. 2(a)) using a part of windings is selected.

Figure 3:
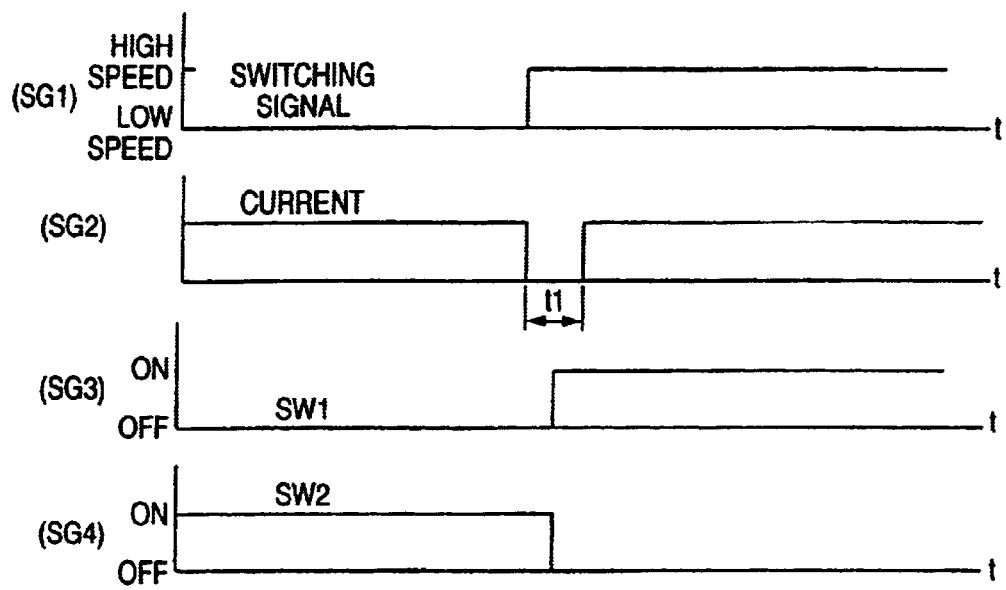
FIG. 3 is a diagram showing a switching sequence according to the invention.
Figure 3:
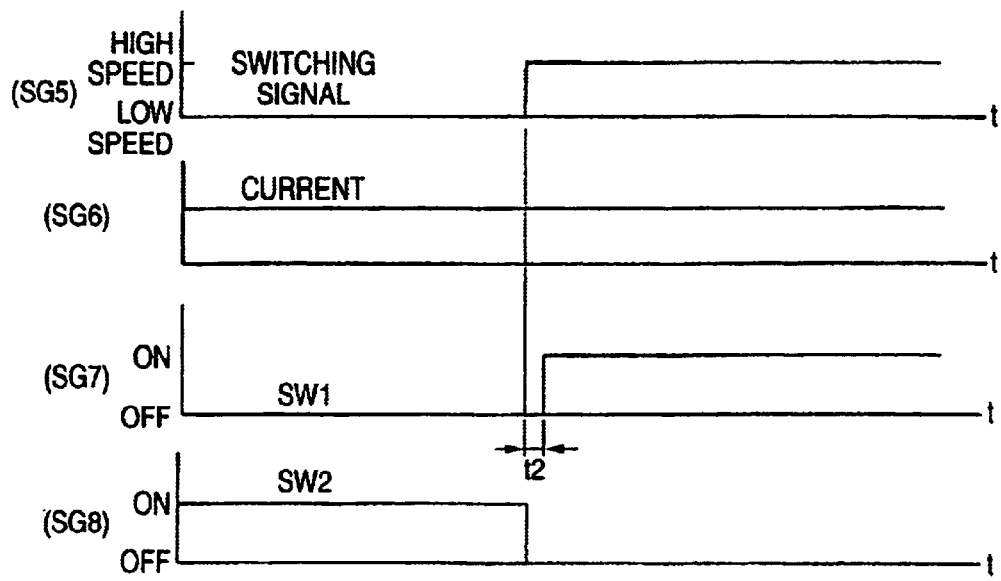

Next, a winding switching method will be described. A sequence for switching SW1 and SW2 has two methods as shown in FIG. 3. In FIG. 3(a), first of all, a current is blocked on the inverter section 1 side in response to a switching signal. In the non-current state, switching between SW1 and SW2 is carried out and a current is then caused to flow again on the inverter section 2 side. A time t1 taken for blocking a current and then causing the current to flow again is required for actual switching. (SG1) indicates a switching signal for a winding which is output from an inverter control circuit or an upper control device for controlling an inverter, (SG2) indicates a current flowing to a motor winding, and (SG3) and (SG4) indicate the conducting states of the semiconductor switches SW1 and SW2 respectively. This method uses a conventional contactor and is carried out for prolonging the lifetime of a contact. Also in the case in which the method is applied to the invention, a unit is turned ON/OFF without a current so that an excessive voltage can be prevented from being applied by switching. Since the operation of a semiconductor unit is carried out quickly, an operating time can be shortened extraordinarily for the period t1 giving the non-current as compared with the method using the contactor.

A switching method shown in FIG. 3(b) serves to carry out switching without blocking a current in the inverter section 1. Although the operation of the semiconductor is carried out very quickly, there is a possibility that a period for simultaneously turning ON SW1 and SW2 might be generated due to a very short operation delay time. In order to eliminate the possibility, therefore, it is necessary to put a dead time t2 in which both of the semiconductor switches SW1 and SW2 are turned OFF for a period in which they are turned ON respectively. Although it is sufficient that the dead time is very short by the high-speed switching characteristic of the semiconductor (usually, several microseconds or less), an energy $(E=(½)Li^2)$ generated by a current (i) stored in an inductance (L) of the motor winding is discharged for this period. Consequently, an overvoltage is applied to a switching circuit. The first embodiment will be given. The capacitor C connected through the diodes D1, D2, D3 and D4 from both ends of SW1 and SW2 in FIG. 1 serves to absorb the surge voltage, and R indicates a discharging resistor. In FIG. 5 showing the variant of FIG. 1, SW1 and SW2 are connected to the smoothing capacitor of the variable frequency power source through the diodes D1, D2, D3 and D4. For this reason, the discharging resistor is not required. In the case in which SW1 and SW2 are to be switched in the non-current state shown in FIG. 3(a), it is not necessary to always provide the capacitor C.

Figure 4:
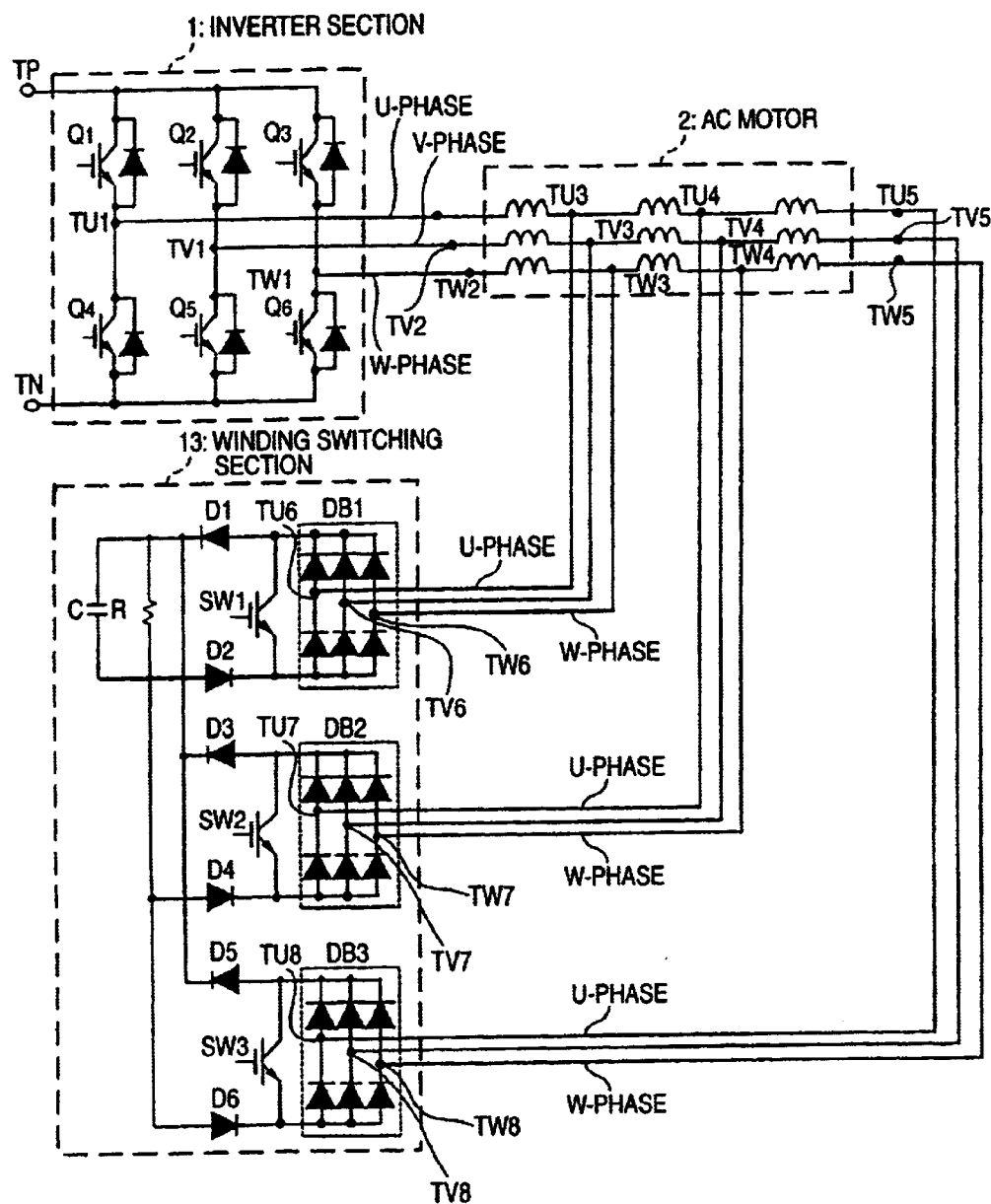
FIG. 4 is a diagram showing the structure of a circuit according to a second embodiment of the invention.

FIG. 4 shows a second embodiment of the invention. In the embodiment, a winding for each phase of a motor is divided into three parts. The second embodiment is different from the first embodiment (FIG. 1) in that the number of divisions of the winding having each phase of the motor is increased from 2 to 3 and a three-phase diode bridge DB3, diodes D5 and D6 and a semiconductor switch SW3 are additionally provided corresponding to the increase in the number of divisions.

Next, description will be given to a structure in which a winding switching section 13 according to the second embodiment is different from the winding switching section 12 according to the first embodiment. One of ends on the cathode side of the diode D5 is connected to one of ends of a CR parallel connecting line terminal in the same manner as terminals on the cathode side of the diodes D1 and D3. One of ends on the cathode side of the diode D5 is connected to the positive side terminal of the DC output of the three-phase diode bridge DB3 and the collector of SW3.

A terminal on the anode side of the diode D6 is connected to the other end of the CR parallel connecting terminal in the same manner as terminals on the anode side of the diodes D2 and D4. A terminal on the cathode side of the diode D6 is connected to a terminal on the negative side of the DC output of the three-phase diode bridge DB3 and the emitter of SW3.

Also in the case of FIG. 4, moreover, a diode for preventing a backward flow can be connected to the DC bus of a variable frequency power source in the same manner as in the structure of FIG. 5 to be the variant of FIG. 1.

Since induction types, synchronizing types, rotating types or direct-acting types are not distinguished for the AC motor used in the invention, any AC motor can be applied.

INDUSTRIAL APPLICABILITY

In a winding switching device of a three-phase AC motor comprising an AC motor in which a winding having each phase is formed by a plurality of windings and a connecting terminal connecting the windings to each other and both terminals of the winding having the phase are provided on an outside of a motor, winding switching means for properly switching the connecting terminal, and a variable frequency power source for supplying a variable voltage having a variable frequency to the AC motor, the winding switching means is constituted by a plurality of three-phase rectifying means connecting one of ends of the winding having the phase to the variable frequency power source and connecting the other end and the connecting terminal to an input terminal on an AC side of the three-phase rectifying means for each phase, and a semiconductor switch provided to open and close both ends on a DC output side of the three-phase rectifying means. Consequently, the following advantages can be obtained.

(1) A time required for switching a winding can be shortened.

(2) The number of semiconductor switch units for switching a winding can be decreased as much as possible to reduce a size and a cost without using a switch having a mechanical movable section.

(3) Also in the case in which an intermediate point power of a winding is to be supplied, a voltage induced into a residual unused winding portion can be prevented from being raised to be equal to or higher than a supply voltage and the insulation of the winding does not need to be intensified.

(4) In the case in which a discharging resistor is eliminated to obtain a state shown in FIG. 5, moreover, an energy is not radiated as a heat loss by the resistor but is absorbed into the smoothing capacitor of the variable frequency power source. Consequently, the energy can be reused for motor driving.

As a ripple effect, the winding can be switched in a considerably short time as compared with a switching method using a contact. Consequently, it is possible to minimize the influence of the switching on a machine and a device to be loads.

What is claimed is:

1. A winding switching device of a three-phase AC motor comprising an AC motor in which a winding having each phase is formed by a plurality of windings and a connecting terminal connecting the windings to each other and both terminals of the winding having the phase are provided on an outside of a motor, winding switching means for properly switching the connecting terminal, and a variable frequency power source for supplying a variable voltage having a variable frequency to the AC motor, wherein the winding switching means includes a plurality of three-phase rectifying means connecting one of ends of the winding having the phase to the variable frequency power source and connecting the other end and the connecting terminal to an input terminal on an AC side of the three-phase rectifying means for each phase, and a semiconductor switch provided to open and close both ends on a DC output side of the three-phase rectifying means.

2. The winding switching device of the three-phase AC motor according to claim 1, wherein the three-phase rectifying means are formed into a three-phase full-wave rectifying diode bridge.

3. The winding switching device of the three-phase AC motor according to claim 1, wherein the DC output side of the three-phase rectifying means is connected to a parallel circuit including a resistor and a capacitor through a diode provided in such a direction that a current flowing from the three-phase rectifying means flows to the parallel circuit when the semiconductor switch is OFF and does not flow backward from the parallel circuit to the semiconductor switch when the semiconductor switch is ON at both ends on the DC output side of each of the three-phase rectifying means.

4. The winding switching device of the three-phase AC motor according to claim 1, wherein the DC output side of the three-phase rectifying means is connected to a DC bus of the variable frequency power source through a diode provided in such a direction that a current flowing from the three-phase rectifying means flows to the DC bus of the variable frequency power source when the semiconductor switch is OFF and does not flow backward from the DC bus of the variable frequency power source to the semiconductor switch when the semiconductor switch is ON at both ends on the DC output side of each of the three-phase rectifying means.

* * * * *